United States Patent [19]
Holston

[11] Patent Number: 6,003,422
[45] Date of Patent: Dec. 21, 1999

[54] SYNCHRONIZED VARIABLE TOOTH ARRANGEMENTS FOR SAWS

[75] Inventor: James R. Holston, Orange, Mass.

[73] Assignee: American Saw & Mfg. Company, East Longmeadow, Mass.

[21] Appl. No.: 08/967,279

[22] Filed: Nov. 7, 1997

Related U.S. Application Data

[63] Continuation of application No. 08/577,930, Dec. 22, 1995, abandoned, which is a continuation-in-part of application No. 08/408,847, Mar. 23, 1995, abandoned.

[51] Int. Cl.⁶ .......................... B23D 61/12; B27B 33/06
[52] U.S. Cl. .................... 83/661; 83/846; 83/852
[58] Field of Search .................... 83/661, 835, 846–852, 83/855

[56] References Cited

U.S. PATENT DOCUMENTS

| | | |
|---|---|---|
| Re. 31,433 | 11/1983 | Clark . |
| 603,128 | 4/1898 | Clemson . |
| 2,227,864 | 1/1941 | Ronan ...................................... 83/846 |
| 2,239,317 | 4/1941 | Gibb . |
| 2,568,870 | 9/1951 | Ronan . |
| 3,292,674 | 12/1966 | Turner . |
| 3,362,263 | 1/1968 | Klein et al. . |
| 4,179,967 | 12/1979 | Clark . |
| 4,423,553 | 1/1984 | Miyawaki . |
| 4,557,172 | 12/1985 | Yoneda . |
| 4,727,788 | 3/1988 | Yoshida et al. . |
| 4,813,324 | 3/1989 | Yoshida et al. . |
| 4,958,546 | 9/1990 | Yoshida et al. . |
| 5,018,421 | 5/1991 | Lucki et al. . |
| 5,094,135 | 3/1992 | Nakahara et al. . |
| 5,331,876 | 7/1994 | Hayden, Sr. . |

FOREIGN PATENT DOCUMENTS

| | | |
|---|---|---|
| 3741709 A1 | 12/1987 | Germany . |
| 9015452 | 11/1990 | Germany . |
| 374103 | 3/1931 | United Kingdom . |
| 863529 | 1/1960 | United Kingdom . |
| 996771 | 10/1962 | United Kingdom . |
| 2113144 | 1/1983 | United Kingdom . |

*Primary Examiner*—Clark F. Dexter
*Attorney, Agent, or Firm*—Cummings & Lockwood

[57] ABSTRACT

A variable pitch band saw is provided which has a toothed edge comprising a plurality of recurrent groups of teeth. Each group includes an unset leading tooth and a plurality of teeth that are alternately set laterally to opposite sides of the saw. Each tooth has a cutting edge disposed in a predetermined cutting plane and an accumulated pitch distance between it and the next preceding saw tooth having a cutting edge coplanar with said predetermined plane. The size of gullet area of each tooth is made directly proportional to the accumulated pitch distance of that tooth so that the size of the gullet areas are the same for all teeth having the same accumulated pitch. Each of the tooth groups may include teeth of varying height and degrees of lateral set, some of the teeth of each group having a different pitch, measured from the tip of one of said teeth to the tip of a tooth adjacent the one, to avoid uniform tooth spacing between all the teeth to the group.

6 Claims, 2 Drawing Sheets

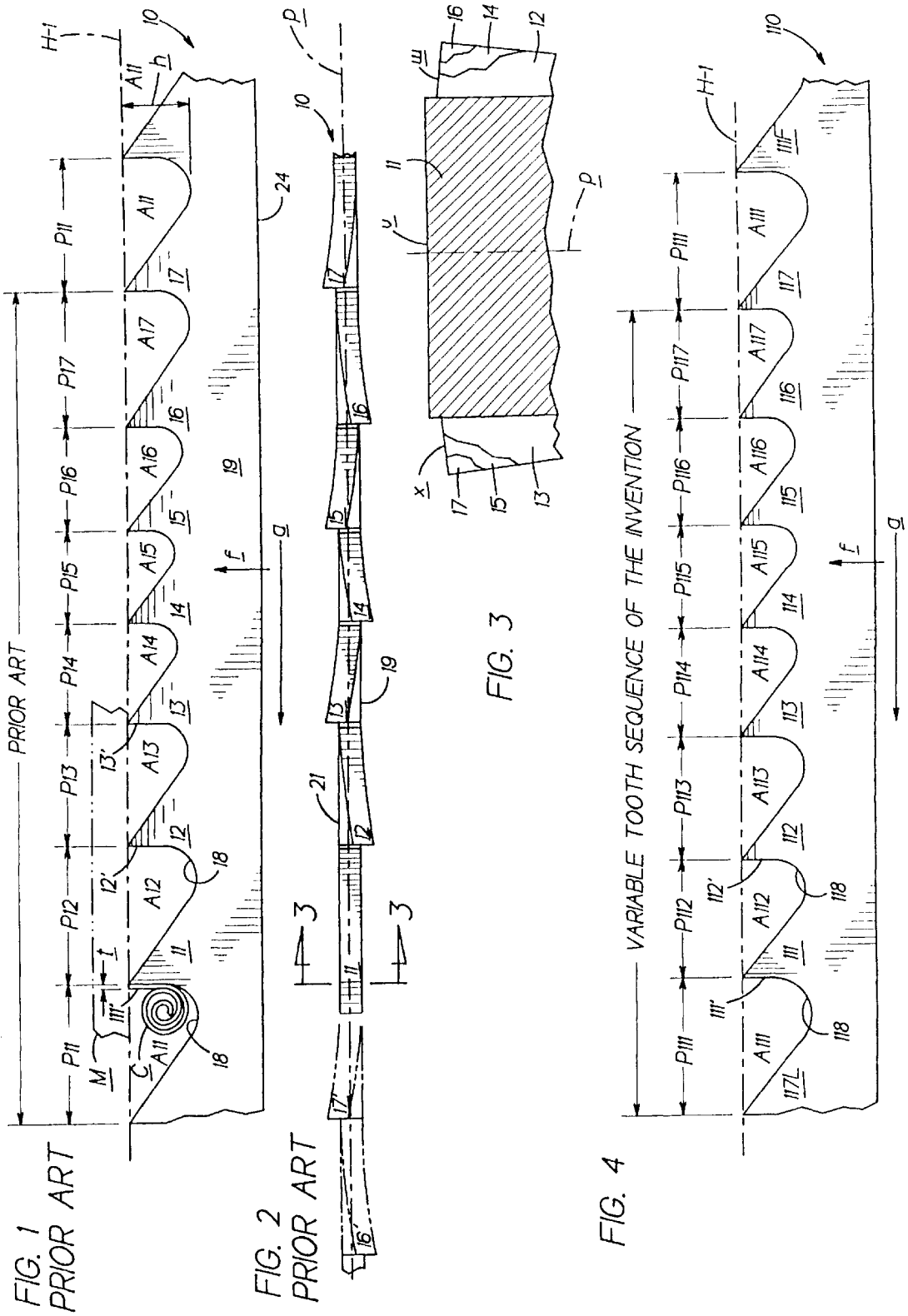

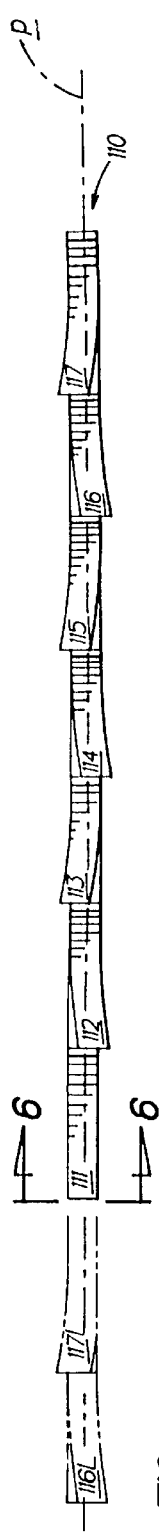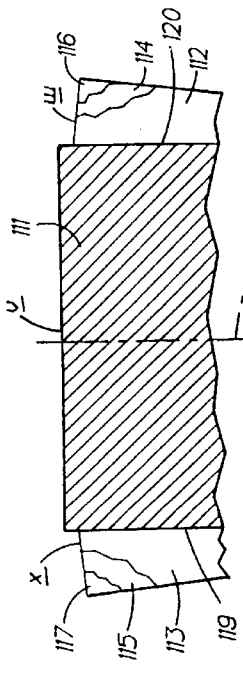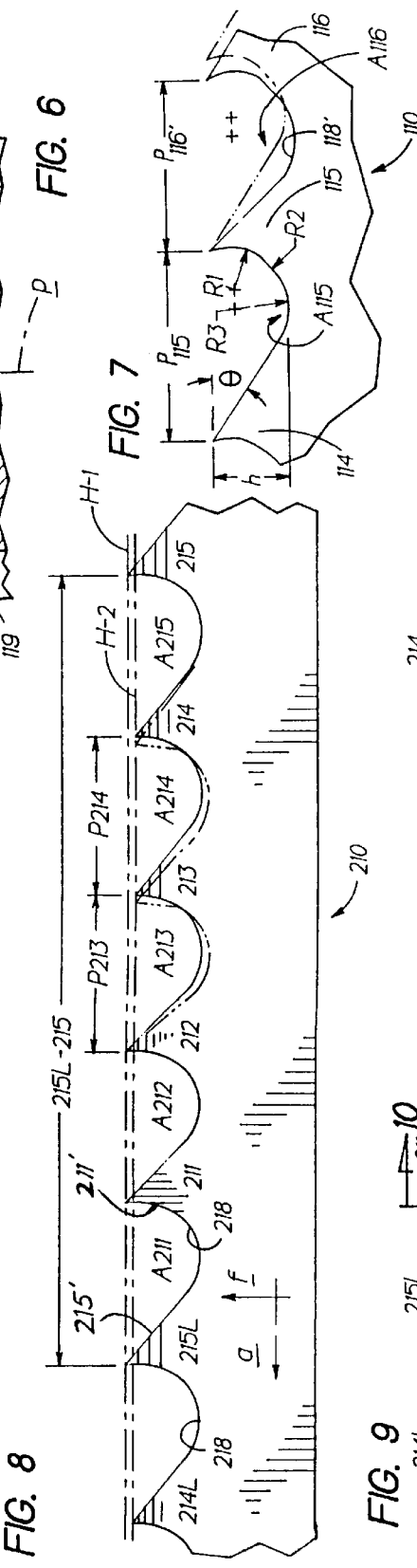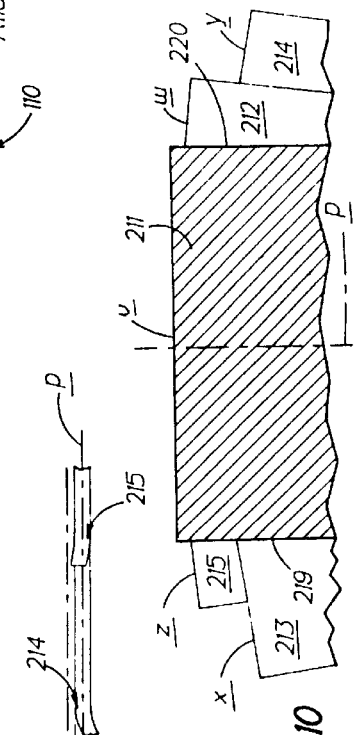

SYNCHRONIZED VARIABLE TOOTH ARRANGEMENTS FOR SAWS

This is a continuation of application Ser. No. 08/577,930, now abandoned, which is a continuation in part of Ser. No. 08/408,847, now abandoned, filed on Dec. 22, 1995 and Mar. 23, 1995 respectively.

FIELD OF THE INVENTION

This invention relates to tooth arrangements for band saw blades and, more particularly, to an arrangement of saw teeth in which the gullet area preceding each of said teeth in the cutting direction, is directly proportional to the accumulated pitch distance of each said teeth and in which at least some of the teeth are separated from other of the teeth by pitch distances that are different so as to inhibit cadenced repetitions being generated by the tips of said teeth contacting the work.

BACKGROUND OF THE INVENTION

It has long been recognized by those skilled in the band saw blade art that a saw tooth edge having a "variable pitch" tooth pattern will avoid the problems of excessive noise and vibrations brought about by equally spaced teeth impacting the work in equal time intervals, with the end result being substantially reduced noise levels and increased blade life. Although band saw blades have generally developed as a distinct branch of the cutting tool art, separate from other cutting tools and other types of saws, it has also been common practice to use variable pitch tooth patterns on cutting edges of cylindrical hole saws for more reliable cutting operations.

Historically, "variable pitch" saw tooth patterns are composed of repetitive groups of saw teeth that are arranged with progressive variations in the pitch between successive pairs of teeth in the cutting direction of the saw blade. The variations are in pitch distances between corresponding points on adjacent teeth, e.g., the pitch distance between the tips of adjacent teeth of the saw. The variations in pitch start at the leading end of the saw and extend toward the trailing end of the saw and are generally cyclical from fine-to-coarse and back to fine again, or visa versa.

One skilled in the art of band saw blades will recognize references to "fine" and "coarse" in relation to a pattern of saw teeth, as referring to the pitch distance between one adjacent leading pair of teeth being less or fine in relation to a coarse, or greater pitch distance between another adjacent pair of trailing teeth in the pattern. It does not mean that such teeth are higher or lower than the others, as measured from a given reference line along the saw.

Examples of earlier attempts at variable pitch type saw blades are disclosed in U.S. Pat. No. 2,227,864 and U.S. Pat. No. 2,568,870. Both patents disclose saws having finer teeth at the leading end of the blade with the teeth gradually become coarser and thereafter again becoming fine. The cycle is repeated over the length of the saw. The gullets also go through the same progression. Thus, these patents relate to changing progressively both pitch and gullet sizes.

U.S. Pat. No. 4,179,967 (reissued as Re. 31,433 in 1983) discloses a variable pitch band saw blade, as shown in FIGS. 1–3, in which the gullet depth and pitch distance between adjacent teeth arranged along the saw first decrease progressively from a leading, unset raker tooth 11 that is the coarsest tooth, to the finest tooth 15, and then progressively increase again to a tooth having the same characteristics as the leading tooth. The teeth also have varying rake angles and the trailing teeth are alternately set laterally to the same extent. While this latter configuration of the '967 patent offers some advantages over the above-referenced '864 and '870 patents, particularly with respect to the reduction of noise and vibration, there remains a common tendency of reduced cutting rates and tooth breakage in all such variable pitch blades, especially when cutting large cross-sections of difficult-to-cut materials. It has been found that such reduced cutting rates and blade failures occur as a result of certain gullets that are too small to accommodate the size of chip material being cut by the blade particularly when being operated at the higher feed rates, as shown at C in FIG. 1.

DISCLOSURE OF THE INVENTION

It is a principal object of this invention to provide an improved saw tooth arrangement that overcomes the drawbacks of variable pitch blades of the prior art while retaining the advantages thereof.

It is an additional object of this invention to provide saw tooth arrangements capable of cutting difficult-to-cut workpieces without tooth breakage and at feed rates comparable to those of conventional variable pitch saw tooth arrangements, as are found in band saw blades.

Another object of this invention is to provide saw tooth cutting tools that are more effective for cutting workpieces of relatively larger cross-sections than heretofore.

It is a further object of this invention to provide saw tooth cutting tools that are less prone to lateral deviation and noise generation than conventional, variable pitch band saws of the prior art.

According to this invention, the cutting edge of a band saw includes a plurality of recurrent groups of teeth, of which each includes a plurality of teeth that are set laterally to opposite sides of the blade. Each of the teeth is characterized by having a cutting edge disposed in a predetermined cutting plane and a gullet area that is directly proportional to the accumulated pitch distance between that tooth and the next preceding tooth which has a cutting edge disposed generally in the same cutting plane as that tooth. As a result, the gullet area of each tooth is adapted by a predetermined area to accommodate the depth of chip cutting ability of each tooth. At least some of said teeth are spaced from other of said teeth by a pitch distance that is different than pitch distances separating others of said teeth. Thus, the blade has sufficient pitch variations from tooth-to-tooth to inhibit cadenced repetitions generated by the tips of said teeth contacting the work in uniform time intervals.

The above and other objects and advantages of this invention will be more readily apparent from a reading of the following description of an exemplary embodiment thereof taken in conjunction with the following drawing.

BRIEF DESCRIPTION OF THE DRAWINGS

FIG. 1 is a side elevational view of a portion of a saw blade of the prior art;

FIG. 2 is a top view of the saw blade portion of FIG. 1 with portions thereof in phantom;

FIG. 3 is a cross-sectional view, on an enlarged scale, taken along 3—3 of FIG. 2, with portions thereof broken away;

FIG. 4 is a view similar to that of FIG. 1 of one embodiment of the present invention;

FIG. 5 is a top plan view of the saw blade portion of FIG. 4 with portions thereof in phantom;

FIG. 6 is a cross-sectional view, on an enlarged scale, taken along 6—6 of FIG. 5, with portions thereof broken away;

FIG. 7 is a diagrammatical view of a gullet and tooth arrangement illustrative of the parameters involved in the relationship between pitch and gullet areas;

FIG. 8 is a view similar to that of FIG. 4 of a further embodiment of the present invention;

FIG. 9 is a top plan view of the saw blade portion of FIG. 8 with portions thereof in phantom; and FIG. 10 is a cross-sectional view, on an enlarged scale, taken along 10—10 of FIG. 9.

DETAILED DESCRIPTION OF THE PREFERRED EMBODIMENT

Shown in FIGS. 1–3, is a conventional prior art variable pitch band saw blade 10 comprising repetitive groups or patterns of teeth, each of which includes an unset leading tooth 11 followed by a plurality of alternately set trailing teeth 12–17. The teeth 16L and 17L, shown in FIG. 2, are from the group of teeth leading, or in advance of the principal group of teeth 11–17 discussed in connection with FIG. 1. As shown in FIGS. 2 and 3, the unset tooth 11 has a plane of symmetry p that defines the sawing plane of the blade and which is parallel to side surfaces 19 and 21 of the blade. As shown in FIG. 1, all of the teeth 11–17 are approximately the same height H-1 with respect to the back edge 24 of the blade 10. As shown in FIG. 3, the tip of tooth 11 is disposed in plane v, while teeth 12, 14 and 16 are disposed in plane w and teeth 13, 15 and 17 are disposed in plane x.

As best shown in FIG. 1, a gullet 18 immediately precedes each tooth face 11'-17' on which a chip is formed, as illustrated at C in FIG. 1. Thus, for example, as tooth 11 moves through a workpiece M in a cutting direction a and feeding direction f, chips C cut from the workpiece coil up along the face of tooth 11 in the gullet area of that tooth. It will be recognized that if any gullet is of insufficient area in the plane of the blade to accommodate the size of the chip that its respective tooth is capable of cutting, then that gullet will, in effect, be the "weak link" and be subject to becoming clogged. Should that occur, not only will that gullet not be able perform its function but it may interfere with a number of teeth in the vicinity of the clogged gullet from being able to take their full cut into the work and that condition could result in the blade wobbling laterally to further compound an already difficult task. Each of the gullet areas designated respectively as A11–A17 for each of teeth 11–17 of FIG. 1 is defined as the area in the plane of the blade that longitudinally corresponds to the pitch distance P11–P17. The spacing between tips of successive teeth and the gullet areas therefor depend upon the depth of the gullet d and the gullet radii and relief angle θ, as also shown in FIG. 7.

Inasmuch as the pitch distance between successive teeth of variable pitch type band saw blades vary from tooth-to-tooth, and the respective gullets also decrease proportionally in area, as illustrated in FIG. 1, there is a tendency for some of the gullets to become clogged with the chip material being cut. This is particularly a problem when cutting difficult-to-cut materials, such as metals of relatively large cross-section in the direction of cutting movement of the teeth relative to the workpiece M, as depicted in FIG. 1. When such a material is being cut, the result is generally in unitary, coil-shaped chips C being formed in each of the gullet areas. When cutting workpieces of larger cross-section, the chips being cut will become larger, as long as the teeth remain in contact with the work and the chips C must be carried by, or accommodated in, the respective gullet of each tooth. In certain problematic cutting situations, the gullets may become so clogged by chips of material being cut from the workpiece that the cutting edge of the respective tooth following that clogged gullet area will be unable to cut further into the workpiece until its next cutting pass. The effect of such clogged gullets, is loss of tracking by such cutting edges, undesirable wobble, deviations of the saw blade from a straight cutting plane and even premature tooth breakage and failure to cut. Despite such a major drawback, however, variable pitch blades are still prevalent in the band saw blade industry because of their vibration dampening, smoother cutting and noise reduction, except for those instances as hereinbefore described in which clogged gullets result in blade wobble that cause vibration problems and even blade failures.

In the present situation, those skilled in the art of cutting tools will recognize that a band saw blade, when looped over spaced-apart drive and idler pulleys of a band saw, will be driven so that its cutting plane moves unidirectionally relative to a workpiece, as compared to reciprocal for most other types of saws. While a saw having reciprocating movement during a cutting operation tends to breakup and/or clear the chips from the gullets generated by such movement, a band saw generally does not tend to break up such chips. Therefore, in the latter type situation, the chip material must be received and contained within each gullet area disposed forwardly of the leading edge or face of each respective tooth which cuts into the workpiece and, in effect, generating the very same chips being received in their respective gullets. Thus, from the time that such a tooth enters the workpiece until it exits therefrom, the chip will necessarily be carried by the respective gullet. Should such a cutting operation result in chips which become too large in cross-section to be wholly contained within any of their respective gullet areas, the gullet areas will become clogged by the chips with all the dire consequences that portend, as will hereinafter be discussed.

Referring now to FIGS. 4–6, a band saw blade 110 of the type embodying the present invention is shown. Although in some respects the blade 110 may be similar to the blade of FIGS. 1–3, it possesses some impressive advantages over the prior art, including prior art variable pitch type band saw blades. Band saw blades of the type that embody this invention are not only capable of improved cutting performance on difficult-to-cut materials, but the performance is even more impressive when the cutting task is further compounded by making the difficult-to-cut materials of larger than usual cross-section. As will hereinafter be demonstrated, blades which embody this invention are shown to be fully capable of performing such formidable tasks without clogged gullets, tooth breakage, lateral deviation and blade failures. In the preferred embodiment, this invention includes recurrent groups of teeth in which each group comprises a plurality of set teeth 112–117, alternately set left and right of the side edges of the blade, as is best shown in FIG. 5. Two additional teeth are also shown at 116L and 117L as the last two teeth of the next leading group. Preferably, the group includes an unset leading tooth 111 followed by six set teeth to thereby form recurrent groups of seven teeth. As illustrated in FIG. 6, the cutting edges of each of the teeth 111–117 are disposed in three separate and distinct cutting planes v, w and x with the associated gullet area of each tooth being designated as A111–A117, respectively.

It was recognized that many of the cutting problems in the operation of band saws blades had come about by failing to place in true perspective, the relative importance of variable pitch and gullet size. Then, it was deemed plausible that the cutting problems associated with band saws blades could be overcome by providing the cutting edges with gullets which in area are correlated to accommodate the maximum size of chip that each respective tooth is capable of producing.

In this regard, it was determined that the size chip capable of being cut by each tooth in the group is a result of the "bite" or "depth of cut" (DOC) of that tooth which, in turn, is directly proportional to the "accumulated pitch" (Pt) of that particular tooth in accordance with the following equation:

$$DOC = Pt \times F / V$$

where:
DOC=Depth of cut for each tooth in the pattern;
Pt=The accumulated pitch;
F=The blade feed rate into the workpiece (in feed direction f); and
V=The band speed (in cutting direction a).

The "accumulated pitch" for any given tooth in a group may be defined as the total pitch distance between the given tooth and the nearest preceding tooth that has its cutting edge in the same cutting plane as the given tooth. The greater the accumulated pitch of any tooth, the greater will be the depth of cut (DOC) or the thickness T (FIG. 1) of the slice capable of being cut by that tooth, inasmuch as, no other cutting edge is disposed within the accumulated pitch distance which will interfere, or compete with that tooth taking a clean cut in its particular cutting plane. The tooth arrangement, as shown in FIG. 4, is essentially the same as shown in FIG. 3 as regards the coincidence of the cutting planes v, w and x. Accordingly, the accumulated pitch of any right set, left set or unset tooth of the blade of FIGS. 4–6, is the pitch distance between it and the immediately preceding right set, left set or unset tooth, respectively. In particular, the right set tooth (plane w) immediately preceding right set tooth 114 (plane w), is tooth 112 which is (2) pitch distances away. Teeth 114, 115, 116 and 117 thus may each be said to have an "accumulated pitch" of (2) pitch distances. Teeth 112 and 113 each has an "accumulated pitch" of (3) pitch distances, i.e., the pitch distance between teeth 112 and 113 and teeth 116L and 117L of the preceding tooth pattern. Tooth 111 has an "accumulated pitch" of (7) pitch distances from tooth 111 to tooth 111L. In particular, the area of each gullet is proportional to the size of the "bite" taken respectively by each tooth in accordance with the above equation.

The "size of chip" (SOC) cut by a given tooth is defined in terms of the area of a chip taken in the plane of the blade p and is determined by multiplying the depth of cut (DOC) by the length of the cross-section of the work parallel to cutting direction a for each cutting pass of a given tooth through the work, as depicted in FIG. 1.

The dimension of the gullets in a direction transverse to the plane of the blade p has not been included in the equation, nor is the width of the chips cut by the saw teeth, since they are functions of the thickness of the saw blade and as such, remain constant. Accordingly, all other variables being held constant, the larger the "accumulated pitch" of a given tooth, the greater will be its depth of cut so that the thickness of chips cut thereby will be correspondingly greater. Each of the gullets must therefore have sufficient capacity to receive and carry a chip of maximum thickness, or depth of cut, that its corresponding tooth is capable of cutting.

As shown in FIG. 4, the unset leading tooth 111, which has an "accumulated pitch", or "Pt" of (7) pitch distances will thus take the deepest "bite" from the workpiece and should also have the largest gullet area A111 of the group. The first pair of trailing teeth 112 and 113, each of which has a Pt of (3) pitch distances and is indicative of the fact that each of those teeth will take the next largest "bite" and have gullet areas A112 and A113, which are essentially of equal area while being smaller than A111. The remaining teeth 114–117, each of which has a Pt of (2) pitch distances, will each take the smallest bite of the teeth in the group and have gullet areas A114–A117 which are also equal to one another while being smaller than A112 and A113.

The seven tooth group of FIGS. 4–6 has three different accumulated pitch distances and produces three different size chips. As a result, the pattern has three different gullet sizes, i.e., 0.0185, 0.0146 and 0.0112 of predetermined chip storage and/or carrying capacity. Moreover, while at least some of the teeth are separated from other of the teeth by pitch distances that are different from pitch distances between the remaining teeth, this is not the case for all of the teeth in the seven tooth group. As shown best in FIG. 4, the pitch for teeth 114–117 are all substantially equal.

One problem that may be encountered with a series of equally spaced saw teeth is that the tips of each of the teeth will contact the work with cadenced repetitions. As a result, the saw blade, like a large spring, will be subjected to unidirectional vibratory sound waves at resonant or harmonic frequencies.

It will be noted, in FIG. 4, that the pitch P111 is the largest, as is the corresponding gullet area of the tooth 111. The pitch for each of the next two teeth 112 and 113, as shown, are equal to each other but are substantially smaller than P111. Further, in FIG. 4, the pitch measured from tip-to-tip of the next four teeth P114–P117 are all generally equal to each other while each is substantially smaller than the pitches of the two leading teeth 112 and 113. Thus, in the FIG. 4 embodiment, the size of each of the gullet areas A111–A117 is directly proportional to the accumulated pitch of the corresponding teeth 111–117. It is also the case that each of the pitch distances P111–P117 is directly proportional to the corresponding gullet area A111–A117. Finally, as shown in FIG. 4 and described above, each group of teeth of the blade 110 includes an unset leading tooth 111 and six alternatively set teeth 112–117. While it has been found that this tooth arrangement is an improvement insofar as overcoming the problems of cutting speed, tooth tracking and tooth breakage, as well as the interrelated but equally troublesome problems of noise and blade vibration, even further improvements with respect to noise and vibration are desirable.

Excessive blade vibration and noise are problems that have been solved in the prior art by use of set teeth which first decrease progressively in gullet depth and pitch and then increase progressively in gullet depth and pitch and in which the shorter teeth are given a more positive rake angle than that of the longer teeth. The tooth arrangement was disclosed and claimed in U.S. Pat. No. Re. 31,433 heretofore discussed and illustrated in FIGS. 1–3. This arrangement of teeth became fairly well accepted as the state of the art in variable pitch band saw blades.

The most important consideration in limiting, inhibiting or nullifying resonant or harmonic frequencies occurring during operation of the band saw blade, is avoidance of cadenced repetitions which are the direct result of equally spaced saw teeth. With the blade 110 of FIG. 4 being driven at a constant speed, as the teeth 111–117 move sequentially through a workpiece starting with tooth 111, the following is a comparative analogue sequence in the intervals of time for successive pairs of teeth to engage the workpiece:

d/d/s/d/s/s/s in which "d" means "different" and "s" means "same" with respect to the time intervals for successive pairs of teeth to move onto engagement with the work.

If this were a five tooth pattern in lieu of the seven teeth of FIG. 4, but otherwise similar thereto, the timing sequence would be: d/d/s/d/s. In either case, it has been found that at least these variations in pitch are sufficient to prevent, overcome or nullify the occurrence of cadenced repetitions which may result in intensification by reinforcement of the vibrational sound waves to resonant or harmonic levels.

In accordance with another feature of this invention, it is feasible to change the gullet size of any tooth independently of the pitch thereof, as when gullet areas are synchronized to accommodate the size of chips to be cut. In FIG. 7, two successive saw teeth and their gullets are illustrated. The teeth depicted therein may be any band saw blade, such as blade 110 and the teeth may also be any consecutive teeth, such as 114, 115 and 116. After having recognized the importance of correlating each gullet with the size of the chip cutting capability for each of the teeth in a group of teeth, the only remaining question that needs to be answered is whether there are sufficient pitch differences between successive teeth of the blade to inhibit cadenced generation of vibration, or sound wave generation upon the tips of the saw teeth contacting the work. As hereinbefore described, pitches P114–P117 of the band saw blade 110 are all equal and if this arrangement should cause a noise, or vibration problem, it can be overcome by changing the configuration of one of the gullets relative to the pitch of the tooth which supplies the chip material into that gullet. More specifically, as is shown in FIG. 7, the pitch measured between the tips of teeth 115 and 114, is P115 and between the tips of teeth 116 and 115, is P116'. Pitch P115 is shown to be of longer distance than P116'.

As illustrated, by changing the relief angle θ and different radii of curvature, as shown in R1, R2 and R3 for the gullet area for tooth 116, the gullet can still be reconfigured as at 118' to remain equal in area to that of the gullet for tooth 115. In this manner, it has been found that one is able to control the parameters of pitch and gullet size independently one from the other. In this example, unlike that of FIG. 4 wherein the pitch between teeth 114, 115 and 116 are the same as are the gullet areas, the pitches P115 and P116' are different but the areas of the gullets A115 and A116 are still equal as illustrated in FIG. 7. In accordance with this invention, control can be maintained over the pitch while independently controlling the areas of the gullets. Moreover, it is now feasible to obtain the benefit of variable pitch without the drawbacks of lower operating speeds and clogged gullet problems.

That same approach could be used in connection with interrupting the uniform pitch of the teeth 211–215, as shown in FIG. 8, in which the gullet areas are all equal as are the pitches. This blade would likely pose a serious noise and vibration problem when used for cutting difficult-to-cut materials. Pursuant to the invention however, as shown in FIG. 7, it would be feasible to use the method as described above to change the pitch of teeth such as 213 and 214, for example, but by recontouring their gullets. By recontouring the gullets, the gullet areas A213 and A214 would still be directly proportional to the accumulated pitch. Thus, I have been able to implement at least two changes in pitch while maintaining the gullet areas equal so as to address both the vibration and the gullet clogging problems at the same time.

This concept contrasts with the prior art blade of FIGS. 1–3 in several important ways. In particular, teeth 12 and 13 of blade 10, which have the same accumulated pitch, each have different gullet areas A12 and A13 while, pursuant to the teachings of the present invention, these teeth have the same chip storage requirements and, therefore, should have the same gullet areas. Similarly, teeth 14–17, each having the same accumulated pitch distance, also have different gullet areas A14–A17 which, in accordance with the present invention, should all be the same. In addition, the gullet areas A114–A117 of the teeth 114–116 of the present invention are larger than the smallest gullet areas A14 and A15 of the prior art. Accordingly, the tooth pattern of the variable pitch saw blade of the present invention, when compared with variable pitch designs of the prior art, allows for higher feed rates and for larger cross-sections to be cut with a given tooth pitch. The invention provides these advantages while, at the same time, eliminating clogging of the gullets, blade wobble or deviation from straight cutting, and excessive wear.

Comparative tests were performed on two saw blades having the same general construction as the blades of FIGS. 1–3 and FIGS. 4–6, respectively, assuming a constant band speed V and feed rate F and a workpiece M with a length of 2.125" in the cutting direction of the saw blade. The results are as follows:

EXAMPLE 1

Prior Art: FIGS. 1–3

| TOOTH PITCH/ SET | NUMBER OF PITCH DIST. IN Pt | DEPTH OF CUT (DOC) × 2.125 = (INCHES) | SIZE OF CHIP (SOC) | GULLET AREAS (SQ. IN.) (FIG. 1) |
|---|---|---|---|---|
| P11/S | 7 | 0.002076 | 0.004411 | A11/.01845 |
| P12/R | 3 | 0.001025 | 0.002178 | A12/.01689 |
| P13/L | 3 | 0.000994 | 0.002112 | A13/.01263 |
| P14/R | 2 | 0.000547 | 0.001162 | A14/.00899 |
| P15/L | 2 | 0.000490 | 0.001041 | A15/.00816 |
| P16/R | 2 | 0.000504 | 0.001071 | A16/.01001 |
| P17/L | 2 | 0.000592 | 0.001258 | A17/.01546 |
| P11/S | 7 | 0.002076 | 0.004411 | A11/.01845 |

As is apparent from the above data, teeth 11, which have the largest accumulated pitch, will produce the largest chip of approximately 0.0044 square inches. Teeth 12 and 13 both have the same accumulated pitch and produce essentially the same size chip of approximately 0.0021 square inches. Teeth 14–17, all have the smallest accumulated pitch distances and each produce a chip of approximately 0.0011 through 0.0012 square inches. Nonetheless, however, it will be noted that gullet areas A13 and A14 are different in area as are gullet areas for teeth 14, 15 and 16.

EXAMPLE 2

Present Invention: FIGS. 4–6

| TOOTH PITCH/ SET | NUMBER OF PITCH DIST. IN Pt | DEPTH OF CUT (DOC) × 2.125 = (INCHES) | SIZE OF CHIP (SOC) | GULLET AREAS (SQ. IN.) (FIG. 1) |
|---|---|---|---|---|
| P111/S | 7 | 0.002067 | 0.004393 | A111/.01848 |
| P112/R | 3 | 0.000938 | 0.001994 | A112/.01457 |
| P113/L | 3 | 0.000974 | 0.002069 | A113/.01457 |
| P114/R | 2 | 0.000582 | 0.001237 | A114/.01117 |
| P11S/L | 2 | 0.000547 | 0.001162 | A115/.01117 |

-continued

| TOOTH PITCH/ SET | NUMBER OF PITCH DIST. IN Pt | DEPTH OF CUT (DOC) × 2.125 = (INCHES) | SIZE OF CHIP (SOC) | GULLET AREAS (SQ. IN.) (FIG. 1) |
|---|---|---|---|---|
| P116/R | 2 | 0.000547 | 0.001162 | A116/.01117 |
| P117/L | 2 | 0.000547 | 0.001162 | A117/.01117 |
| P111/S | 7 | 0.002067 | 0.004393 | A111/.01848 |

Referring to EXAMPLE 2, based on the present invention as illustrated, for example, in FIGS. 4–6, teeth 111 have the largest accumulated pitch and produce the largest chip of approximately 0.0044 square inches. Teeth 112 and 113 both have the same "accumulated pitch" of (3) pitch distances and produce essentially the same size chip of approximately 0.0020 square inches. Teeth 114–117, all have the same "accumulated pitch" of (2) pitch distances and each produce a chip of approximately 0.0012 square inches.

In a further embodiment of this invention, teeth could be provided with varying degrees of height and lateral set. For example, as shown in FIGS. 8–10, a repeating five tooth pattern includes an unset leading tooth 211 followed by alternately set trailing teeth 212–215. Referring to FIG. 8, the first and last of the trailing teeth 212 and 215 are approximately the same height H-1 as the unset leading tooth 211 and, as shown in FIGS. 8 and 9, each is provided with a relatively "light" set to opposite sides of plane p. Trailing teeth 213 and 214 are both of a lower height H-2 than the other teeth of the group and are each provided with a relatively "heavy" set to opposite sides of plane p. As shown in FIG. 9, the cutting tip of each tooth 211–215 in the pattern is disposed in its own cutting plane v, w, x, y and z, respectively.

As discussed above, the accumulated pitch of each tooth is determined relative to the next preceding tooth having a coplanar cutting edge which, in this case, is the corresponding tooth of the preceding tooth pattern. For example, as shown in FIGS. 7 and 8, the next preceding tooth having a coplanar cutting edge with tooth 215 is corresponding tooth 215L of the preceding tooth pattern. Since five teeth are disposed between succeeding coplanar teeth, each tooth in the pattern has an "accumulated pitch" equal to the total of the (5) pitch distances. Thus, in accordance with the teachings of the present invention, since each tooth has the same accumulated pitch, all the teeth would also have gullet areas of equal size and if the pitch were proportional to gullet area, the tips of all the teeth would be equally spaced apart and there would in all likelihood be substantial noise problem in operating this type of blade in cutting difficult-to-cut materials.

To deal with such noise problems and as previously described in connection with FIG. 7, some changes in pitch may be incorporated into the blade 210, if necessary, to prevent undue cadenced repetitions caused by uniformly spaced teeth.

As previously defined herein, the "gullet area" may be defined, for example, with reference to tooth 211, as the area in the plane bounded by the front face 211' of each tooth of the blade p, by the back 215L" of the tooth immediately preceding 211, by the lower edge of the gullet as at 218, and by a line touching the tooth tip that is parallel to the back edge of the blade indicative of the height of each tooth. Additional parameters that may be included in determining the gullet area include the radii of the lower edge of the gullet and the relief angle θ of the back face tooth in question and the relief angle of the preceding tooth. In particular, the gullet areas A211, A212 and A215 of the higher teeth 211, 212 and 215 are determined using line H-1 while the areas A213 and A214 of the lower teeth 213 and 214 are determined using line H-2. Accordingly, since different height lines are used, the other parameters affecting the gullet area, such as gullet depth, must be modified to provide uniformity in area from tooth-to-tooth.

Prototype band saw blades produced in accordance with this invention were tested in two different cutting operations for evaluation of their performance in comparison with commercially available saw blades. Except that the gullet sizes of the prototypes were correlated to the accumulated pitch distances of each of the teeth thereof, the prior art blades were, in all respects, identical to the prototypes. The previously available blades were 15'×1.36"×0.042", having a variable pitch pattern of 4/6 teeth per inch, or 25.4 mm were tested for comparison with synchronous band saw blades 15'×1.36"×0.042", with a variable tooth pattern of 4/6 teeth per inch. In both cases, the blades were disposed on a Hem Band Saw 1200 Model operated at band saw speed of 219 SF/min. and a feed rate of 4.53 sq.in./min. that were used for cutting the same workpiece, i.e., 5/5 A36 angle iron with 4 pieces per bundle. The results were as follows:

| Results | Prior Art | "Synchronized Pitch" of Invention Design 1 | "Synchronized Pitch" of Invention Design 2 |
|---|---|---|---|
| Avg. Lie (# Cuts) 6 Blade Average | 201 | 241 | 282 |
| Cut Rate (Sq. In./Min.) | 6.83 | 6.62 | 6.57 |

It will be noted that blade of the type embodying this invention had superior wear life with cutting rates comparable to those of the prior art blades.

In a second comparative test, the prior art and prototype blades were, in all cases, used on a Hem Band Saw 1400 Model and were tested by cutting the same workpiece, i.e., 18"×7¾" I-beam. The cutting span and the I-beam were oriented so as to impose a most difficult cutting situation wherein the cutting edge of the saw simultaneously engaged the cross-section of the I-beam, including both its flanges and the web portion thereof. The test results listed below clearly establish the superior performance of the tooth arrangements embodying this invention, that is, in one test run, the prior art blade failed during the first cut. The synchronous blade continued to cut without tooth failure for at least four cuts through the I-beam whereas the No. 2 prior art blade failed because of tooth breakage or being stripped off the blade during the first cut. Further, although the No. 1 prior art blade did not fail during the cutting test, it will be noted that the prior art blade had a significantly higher noise level than the synchronous blade of 100 db compared to 95 db. In addition, the prior art blade had a substantially greater transverse deviation from the straight cut achieved by the synchronous blade. The test results were as follows:

| | Teeth/ inch | Max. Noise (db) @ 100% Traverse Rate | Deviation Cut (inches) @ 100% Traverse Rate |
|---|---|---|---|
| Prior art blade No. 1 | 4/6 | 100 | 0.007 |
| Prior art blade No. 2 | 4/6 | Failed | Failed |

-continued

|  | Teeth/inch | Max. Noise (db) @ 100% Traverse Rate | Deviation Cut (inches) @ 100% Traverse Rate |
|---|---|---|---|
| Synchronous Blade | 4/6 | 95 | 0.000 |

The preferred embodiment of the present invention combines a variable pitch distance between successive teeth other than for the teeth which have the same gullet depth, because they have the same accumulated pitch. As a result, blades embodying this invention have the capability of performing more difficult cutting tasks than comparable blades heretofore available. Moreover, these saws are also capable of providing the benefits normally attributed to variable pitch blades, including reduced vibration and noise, as well as less deviation in the cutting plane.

It should, however, be understood by one skilled in the art that the tooth pitch of the blade could be varied independently of the gullet area/accumulated pitch as long as the gullet area remains generally the same for all teeth of a given accumulated pitch and, therefore, remain within the spirit and scope of the present invention.

Although the invention has been shown and described with respect to exemplary embodiments thereof, it should be understood by those skilled in the art that a recurrent tooth pattern comprising any number of teeth and various other changes, omissions, and additions in the form and detail thereof, may be made therein without departing from the spirit and scope of the invention.

Having thus described the invention, what is claimed is:

1. A band saw blade comprising:

a plurality of saw teeth disposed along the blade and defining a cutting edge thereof, said saw teeth being arranged in a plurality of recurrent groups of teeth including an unset leading tooth and a plurality of trailing set teeth extending laterally outwardly from the blade, each of the set and unset teeth having a respective accumulated pitch, at least one of the set teeth having a first accumulated pitch and at least another of the set teeth having a second accumulated pitch different from the first accumulated pitch; and a plurality of gullets disposed along the cutting edge of the blade, each gullet being associated with a respective one of the plurality of saw teeth disposed along the blade and having an area proportional to the accumulated pitch of its associated tooth, wherein the larger the accumulated pitch of the associated tooth the greater the area of the gullet.

2. A band saw blade comprising:

a plurality of saw teeth disposed along the blade and defining a cutting edge thereof, said saw teeth being arranged in a plurality of recurrent groups, each group including a plurality of set teeth extending laterally outwardly from the blade, each of the set teeth having an accumulated pitch, at least one of the set teeth having a first accumulated pitch and at least another of the set teeth having a second accumulated pitch different from the first accumulated pitch, wherein at least some of the teeth have a pitch distance different from others of the teeth; and a plurality of gullets disposed along the cutting edge of the blade, each gullet being associated with a respective one of the plurality of saw teeth disposed along the blade and having an area proportional to the accumulated pitch of its associated tooth, wherein the larger the accumulated pitch of the associated tooth the greater the area of the gullet.

3. The band saw blade of claim 2, wherein each group of teeth comprises an unset leading tooth and at least a first and a second pair of set teeth, and wherein the unset tooth has an accumulated pitch of at least 5, the first pair of trailing set teeth having an accumulated pitch of at least 3, and the second pair of trailing set teeth have an accumulated pitch of at least 2.

4. The band saw blade of claim 2, wherein each group of teeth comprises an unset leading tooth and at least a first, a second, and a third pair of trailing set teeth, and wherein the unset leading tooth has an accumulated pitch of 7, the first pair of trailing set teeth have an accumulated pitch of 3, and the second and third pairs of set teeth have an accumulated pitch of 2.

5. The band saw blade of claim 2, wherein each group of teeth comprises an unset leading tooth, a first pair of trailing set teeth, and a second pair of trailing set teeth, the first pair of trailing set teeth having the same height and the second pair of trailing set teeth having a lesser height than the first pair of trailing set teeth.

6. The band saw blade of claim 5, wherein the second pair of trailing set teeth extend laterally outwardly from opposite sides of the blade further than the first pair of trailing set teeth.

* * * * *